July 27, 1965
O. H. WINN
3,197,776
RECEIVER-INDICATOR SYSTEM FOR RADAR APPARATUS
Filed Sept. 11, 1952
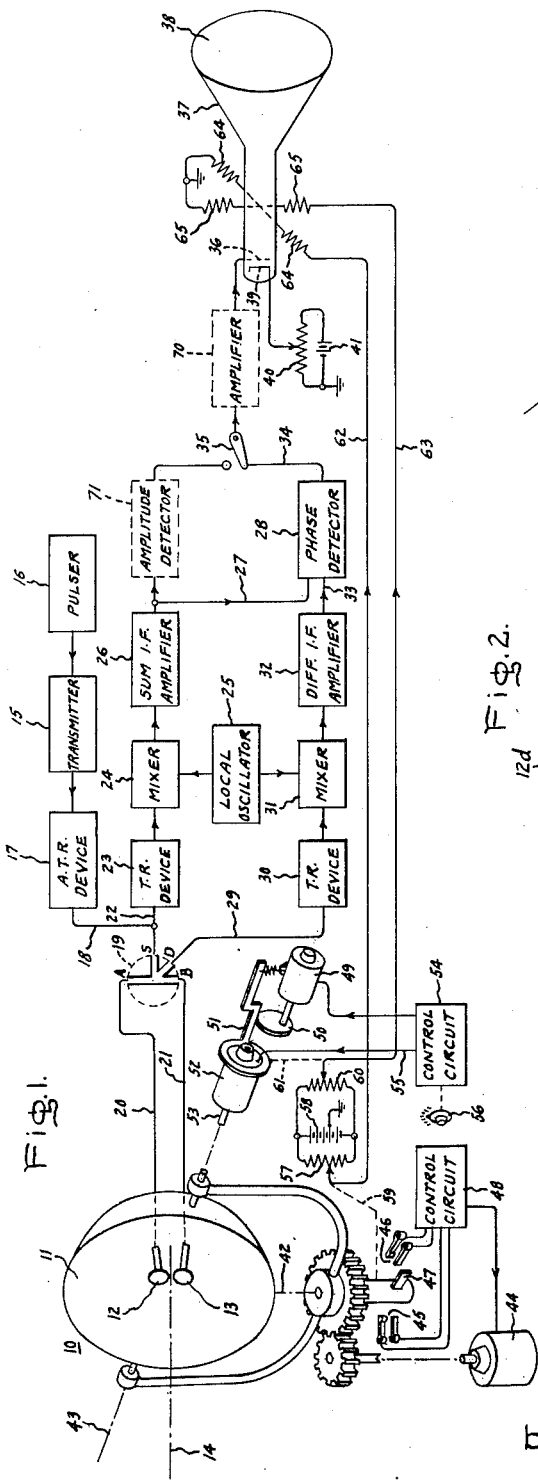
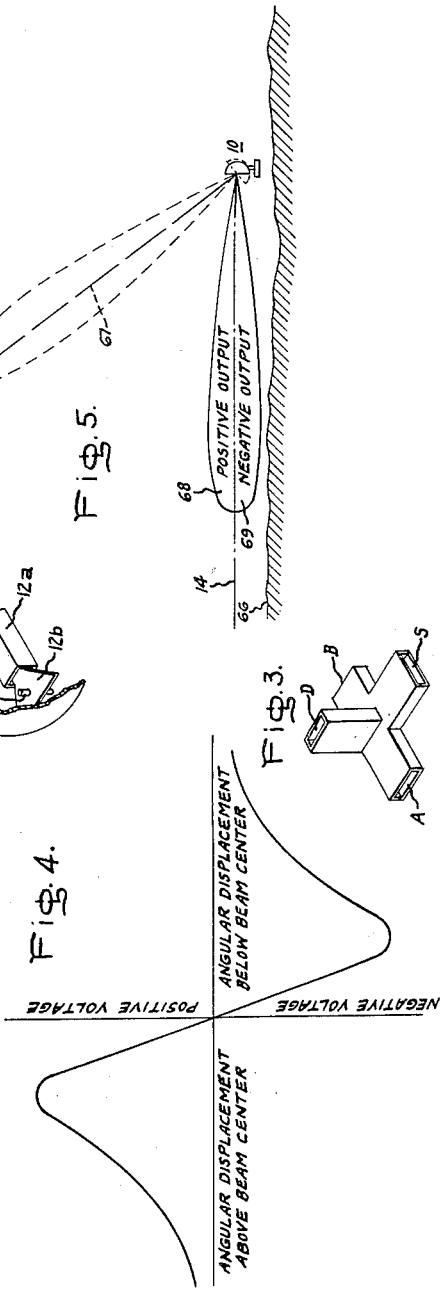
Inventor:
Oliver H. Winn,
by Merton D. Morse
His Attorney

United States Patent Office 3,197,776
Patented July 27, 1965

3,197,776
RECEIVER-INDICATOR SYSTEM FOR RADAR
APPARATUS
Oliver H. Winn, Camillus, N.Y., assignor to General
Electric Company, a corporation of New York
Filed Sept. 11, 1952, Ser. No. 308,963
11 Claims. (Cl. 343—17.1)

My invention relates to object detection equipment of the pulse-echo type and it has for one of its objects to effect certain improvements therein whereby better indications of remote objects are obtained.

One problem frequently encountered in pulse-echo apparatus arises from undesired reception of echo pulses either from the earth or sea within the range of the equipment. Such undesired echo pulses produce luminous effects on the viewing screen of the cathode ray indicator that is employed tending to obscure, or mask, the desired indications of remote objects that are to be detected. These luminous effects are commonly referred to as ground or sea "clutter" and occur both in airborne and land based equipments. One of the objects of my present invention is to provide means to minimize these undesired effects.

In carrying out my invention means are provided for radiating pulses of wave energy, for example, by means of a pair of commonly excited, directional radiators of the monopulse phase comparison or amplitude comparison type. In a particular embodiment involving a phase comparison monopulse system, the radiators are disposed on opposite sides of a reference horizontal plane to provide essentially spaced apart parallel field patterns. The radiators also operate as receptors and their output is combined in such a way that undesired reception is minimized. This may be accomplished by combining the receptors' outputs in such a way that echo pulses received in the two receptors from directions in a vertical plane below the reference horizontal plane produce pulses of, say, negative polarity relative to ground, whereas those received in the two receptors from directions above the reference plane produces pulses of positive polarity. The indicator is arranged to respond to positive potentials and to be essentially unresponsive to negative potentials. Since echo pulse causing "ground clutter" are received principally from below the reference plane and cause negative potentials, the undesired "clutter" effect is minimized.

Thus, an object of my invention is to provide means to radiate pulses in a direction defining a reference plane and to receive echoes with maximum effect from reflecting objects to one side of the reference plane and with minimum effect for objects on the opposite of the plane.

The novel features which I believe to be characteristic of my invention are set forth with particularly in the appended claims. My invention itself, however, both as to its organization and method of operation, together with further objects and advantages thereof may best be understood by reference to the following description taken in connection with the accompanying drawing in which:

FIG. 1 is a schematic diagram, partly in block form, of a complete radar apparatus including a receiver-indicator system constructed in accordance with my invention;

FIGS. 2 and 3 are a detail perspective view of elements of the apparatus shown in FIG. 1;

FIG. 4 is a graph representing an operating characteristic of a portion of the apparatus shown in FIG. 1; and FIG. 5 represents a vertical cross section of the effective field or space pattern of the receiver-indicator illustrated in FIG. 1.

Referring now to FIG. 1 of the drawing, there is shown a phase comparison antenna system 10 comprised of a parabolic reflector 11 and a pair of antenna elements 12 and 13 spaced vertically relative to one another on opposite sides of the focus of parabola 11. The antenna elements are of identical construction and, as shown in FIG. 2, each may comprise a section of waveguide 12a provided with a transition plate 12b at its open end which effectively changes the waveguide to a line-type element. A dipole radiator 12c is fixed to plate 12b and a reflector disk 12d reflects wave energy between the radiator and the inner surface of parabola 11.

Antenna elements 12 and 13 may be considered as being on opposite sides of a reference horizontal plane, represented by the dash-dot line 14 in FIG. 1. The antenna elements 12 and 13 are spaced reasonably close to one another, and are tilted so that the upper antenna 12 operates in conjunction with the upper half of parabola 11 and the lower antenna 13 employs the lower half of the parabola. The major lobes of antennas 12 and 13 are essentially in spaced apart, parallel relationship and, generally stated, they have similarly oriented energy-distribution space or field patterns, which as is well-known, are the same for radiating as well as for receiving wave energy.

Although a single reflecting parabola 11 has been shown, it is to be understood that the antenna system may comprise vertically spaced parabolas, each being associated with one of antennas 12 and 13.

The transmitting portion of the apparatus shown in FIG. 1 comprises a transmitter 15 which, under the control of pulser 16, supplies pulses or "bursts" of radio-frequency energy through an anti-transmit-receive (A.T.-R.) device 17 and a section of waveguide 18 to the sum arm, designated S of an energy-distribution coupler 19.

Device 17 may be of any well-known construction which serves to connect transmitter 15 with waveguide 18 during pulse transmission. However, during intervals between pulse transmissions, it opens this connection to prevent undesirable attenuation of received pulses.

Energy-distribution coupler 19, represented schematically in FIG. 1, is shown in FIG. 3. It has four arms indicated by the reference letters A, B, D and S. If two waves of the same frequency are fed into arms A and B, respectively, their vectorial sum is derived at arm S and the vectorial difference is derived at arm D. Conversely, if wave energy is supplied to arm S, it is divided equally between arms A and B and is derived at these arms with a common phase.

As shown in FIG. 1, arms A and B of coupler 19 are connected via waveguides 20 and 21, respectively, to antenna elements 12 and 13. Thus, wave energy from transmitter 15 is supplied to the antennas which effectively operate as a single radiating body to radiate pulses of wave energy into space in the general direction of line 14.

Energy from antenna system 10 travels through space and may impinge upon a reflecting surface of a remote object and thus pulses are returned to a parabola 11 and reflected toward antennas 12 and 13. The outputs, or radio-frequency potential pulses, derived from each of the antennas, are supplied over waveguides 20 and 21 to arms A and B of coupler 19 which, as pointed out hereinbefore, functions as a combining means for deriving the vector sum at arm S and the vector difference at arm D of the applied wave potentials.

The pulses of the sum wave are supplied over a waveguide 22 and via a transmit-receive (T.R.) device 23 to a sum channel. Device 23 may be of any conventional construction and serves to disconnect the sum channel from coupler 19 during pulse transmission thereby to prevent damage and/or blocking thereof. It operates together with device 17, i.e., when device 17 effectively opens the connection between transmitter 15 and waveguide 18, device 23 connects the sum channel with the waveguide and vice versa. Such arrangements are commonly deferred to as duplexing systems.

The sum channel comprises a mixer 24 in which the sum wave is heterodyned with oscillations from a local oscillator 25 to derive pulses of an intermediate-frequency wave. The latter wave is amplified in amplifier 26 and applied over a lead 7 to one input of a phase detector 28.

Pulses of the difference wave, derived at arm D of coupler 19 are applied over a waveguide 29 and a transmit-receive device 30, similar in construction to device 23, to a difference channel comprised of mixer 31 which also utilizes the output of local oscillator 25 to produce an intermediate-frequency pulse-wave at the same frequency as derived in the sum channel. After amplification in amplifier 32, the difference pulse-wave is applied over a lead 33 to another input of phase detector 28.

Each of the circuit elements thus far described, may be of conventional construction; hence, a detailed description thereof is deemed unnecessary.

As is generally well understood, the sum and difference vectors of two equal vectors of variable phase are displaced from each other by either 90° or by 270°, depending upon the phasing of the equal vectors with respect to one another. Of course, when the equal vectors are in phase, the sum is a maximum and the difference is zero and when they are exactly out of phase the sum is zero and the difference is maximum. If the equal vectors are supplied to a phase detector sensitive to quadrature input waves, it is apparent that the output thereof is of positive or negative polarity depending upon the relative phase displacement of the two equal vectors with respect to an in phase condition.

In FIG. 1, it is evident that for any reflecting object disposed in the horizontal reference plane defined by line 14, the reflected pulse-wave arrives at antennas 12 and 13 at the same time and with equal intensity because they are equally spaced from the reflecting body, i.e., there is no phase displacement between the vectors which represent the received wave at the two antennas. Since mixers 24 and 31 utilize a common local oscillator (25), the intermediate-frequency waves are of a similar character and the output of phase detector 28 is zero.

Assume now a condition in which a reflecting object is disposed above the horizontal plane defined by line 14. The reflected wave arrives at antenna 13 slightly later than at antenna 12, because of the vertical spacing between the antennas. Thus, the output waves of the antennas are displaced in phase and the sum and difference intermediate-frequency waves supplied by amplifiers 26 and 32 to phase detector 28 are phase displaced, for example, by 90° and the detector produces a resulting output potential on lead 34 of positive polarity.

Similarly, for a reflecting object below the reference plane, the wave at antenna 12 arrives later than at antenna 13, amplifiers 26 and 32 supply sum and difference intermediate-frequency waves displaced in phase by 270° and a negative potential is derived at lead 34.

Referring now to FIG. 4, which is a curve representing the output potential on lead 34 as ordinates plotted against the angular displacement of reflecting objects in the vertical plane, plotted as abscissae, it may be observed that the output potential on lead 34 has a range of positive values relative to a reference potential, such as zero or ground, for energy reflected by remote objects disposed in space above the reference plane. The output potential has a range of negative values relative to zero for energy reflected by remote objects disposed in space below the reference plane. The magnitude of the output potential, of course, varies with angular displacement from beam center 14, however, the output is always positive for reflecting objects above the reference line and negative for reflecting objects below the line. It is this feature which is used to advantage in the receiver-indicator system of my present invention.

In order to produce indications of remote objects, the output potential on lead 34 is applied through a pair of closed contacts of a single pole-double throw switch 35 to control electrodes 36 of a cathode ray type indicator 37. Indicator 37 includes a viewing screen 38 and a cathode 39 for projecting a beam of electrons toward the viewing screen. Cathode 39 is connected to the movable tap of a potentiometer 40 which is shunted across a source of potential 41, the negative terminal of which is grounded.

The movable tap of the potentiometer is adjusted so that only potentials of positive polarity at control electrode 36 are effective to control the electron beam from cathode 39 to produce an indication on screen 38. Potentials of negative polarity at control electrode 36, relative to ground, interrupt the electron beam and thus indications appear on viewing screen 38 only for reflecting objects that are disposed above the horizontal plane defined by line 14. Since objects disposed below the reference plane produce negative output potentials at control electrode 36, indications from such objects are excluded from appearing on the viewing screen. Thus, cathode ray tube 37 constitutes means for producing indications in response to output potentials from detector 28 within only the positive range of values.

To obtain information as to the position in space of reflecting objects, antenna system 10 is supported for rotation about a vertical axis 42 and for tilting movement about a horizontal axis 43. A driving motor 44 that is mechanically coupled to antenna system 10 produces rotation about axis 42. This motor is caused to rotate the antenna 10 first in one direction and then the other through a range determined by a pair of limit switches 45 and 46, actuated by an arm 47. These switches operate through a control circuit 48 to reverse the direction of rotation of motor 44, when the antenna 10 is at the respective extreme limits of its range of movement. With this arrangement, antenna system 10 is caused to oscillate slowly about vertical axis 42 between pre-set limits and thus scans in azimuth.

Another driving motor 49 continuously rotates a cam 50 that drives an arm 51 affixed to the casing of another motor 52, the function of which will be described shortly. Shaft 53 of motor 52 is mechanically coupled with antenna system 10 and assuming that casing 52 and shaft 53 are fixed relative to one another by a normally-actuated brake mechanism (not shown), it is apparent that cam 50 causes antenna system 10 to "nod" or oscillate in the vertical plane about horizontal axis 43. The rotational speed of motor 49 is great enough so that the "nodding" or elevation scanning of the antenna system occurs at a much higher rate than the oscillations about vertical axis 42 and according antenna system 10 scans a pyramid-like volume of space.

A control circuit 54, electrically connected with motor 52 by a lead 55, is provided with a manual control 56 by means of which motor 52 may be rotated through a predetermined number of degrees. Of course, the brake (not shown) must be released to permit rotation. In that way, the mean elevation of the elevation scanning of antenna system 10 may be adjusted.

In order to translate movement of the antenna system to indicator 37, the radar apparatus is provided with an azimuth potentiometer 57 which is shunted across a source of supply potential 58 having an intermediate terminal thereof grounded and which has its movable tap mechanically connected by a linkage 59 with the antenna system so that the tap is positioned in accordance with the azimuthal position of the antenna system. Similarly, an elevation potentiometer 60 is shunted across source 58 and its movable tap is mechanically connected by a linkage 61 to the frame of motor 52.

The resulting potentials at the movable taps of potentiometers 57 and 60 are applied over leads 62 and 63 to the horizontal and vertical deflection coils 64 and 65 respectively, which are disposed about the neck of cathode ray indicator 37. Since the current through each set of deflection coils is dependent upon the position of the tap of the associated potentiometer, the apparatus includes means synchronized with the control motors 44 and 49, which concurrently displace the space patterns of antennas 12 and 13, for deflecting the electron beam of indicator 37 in accordance with scanning of the antenna.

In the absence of wave energy from reflecting objects, the intensity of the electron beam of indicator 37 is so low that its trace does not appear on viewing screen 38. However, with the interception of energy pulses from a reflecting object disposed above the plane of line 14, positive output pulses of phase detector 28 increases the beam intensity and an indication by way of an intensified spot appears on viewing screen 38. The position of the spot, of course, depends upon the position of antenna system 10 at the time reflected waves are received from the corresponding remote object and hence position information is derived in a well-known manner.

In order best to appreciate the manner in which receiver-indicator system in accordance with my invention minimizes the effects of ground returns, reference is made to FIG. 5 which illustrates the overall space pattern for the system. The antenna array 10 is shown in a position relative to ground or earth surface 66 such as might occur with the equipment disposed atop a tower or carried by a low-flying aircraft. The antenna is shown to an exaggerated scale in order to simplify the representation.

Control 56, associated with circuit 54, is adjusted so that the line of maximum directivity of antenna array 10 may not tilt downwardly in elevation below that shown in FIGS. 1 and 5. In other words, the nodding action of this line extends between a horizontal plane, as represented by line 14 in FIG. 5, and a plane represented by a broken line 67. Since the output of phase detector 28 is positive only for objects lying within the portion 68 of the antenna pattern, and negative output occurs for objects within portion 69, it is apparent that in the intervals during which antenna system 10 is at its lowermost position, i.e., that illustrated by solid lines in FIG. 5 returns from ground surface 66 cause negative pulses to be supplied to control electrode 36. Remote objects such as aircraft above horizon line 14 produce positive pulses and cause indications while ground return indications are minimized if not altogether eliminated. Thus, there is no interfering ground "clutter" on viewing screen 38 which might otherwise obscure indications of aircraft traveling above the plane of line 14.

It is apparent that in installations aboard an aircraft, gyro-stabilization may be employed to compensate movements due to rough air which may tilt the entire craft with the antenna system downwardly to a degree that positive output lobe 68 "sees" ground level 66. Specifically, a correction potential from a gyro system may be applied to control circuit 54 to govern movement of motor 52 and maintain scanning of the antenna system between the limits shown in FIG. 5, irrespective of pitching motion of the craft. Such an arrangement is considered to be generally well-known and hence the details need not be presented herein.

Referring again to FIG. 1, if it is found that the magnitudes of the output potentials derived at lead 34 are not of sufficient amplitude to drive control electrode 36 for proper operation of indicator 37, an amplifier 70 may be interposed. Since this amplifier is optional, it is illustrated by a broken-line rectangle and may include any well-known form of circuit for amplification, incorporating suitable direct-current restoring means for maintaining a reference potential at ground level at control electrode 36. There are thus applied to the control electrode, potentials of positive and negative polarity corresponding to the positive and negative output of phase detector 28.

Alternatively, amplifier 70 may include a suitably biased stage which produces no output in response to negative potentials at lead 34, but which does supply an output wave to control electrode 36 only for output potentials of positive polarity. Thus, control electrode 36 is not presented with pulses corresponding to objects disposed in negative lobe 69 (FIG. 5) and the amplifier together with cathode ray tube 37 may be considered as means for producing indications in response to output potentials from detector 28 within only the positive range of values.

The apparatus of FIG. 1 may also include an amplitude detector 71 having its input coupled to the output of sum amplifier 26 by an extension of lead 27. By manipulating switch 35, the output of amplitude detector 71 may be supplied to control electrode 36 and since, in so far as the sum channel is concerned, the antennas operate as a single unit, conventional operation may be achieved. That is, indications may be produced for remote objects disposed in either or both of the lobe portions 68 and 69 of FIG. 5.

If it is desired to employ amplitude rather than phase comparison, antennas 12 and 13 are positioned so that their respective radiation patterns effectively emanate from a common point but are angularly skewed relative to one another. Thus, returns from a remote object produce waves in both waveguides 20 ad 21 which are always in phase, but differ in amplitude. In this case, the difference wave is either in phase or 180° out of phase with the sum wave. A phase detector is employed which is sensitive to in-phase and out-of-phase components and a resulting output characteristic essentially as shown in FIG. 4 is obtained. Thus, the term "similarly oriented," as applied to the energy-distribution space patterns of the antennas, is intended to denote both phase comparison as well as amplitude comparison patterns.

A slightly higher operating efficiency may be achieved by supplying the energy from transmitter 15 to difference arm D instead of to sum arm S. In that way, the field pattern for transmission is the same as the receiving field pattern and a greater amount of power is radiated since a narrower field distribution is employed. Consequently, a greater amount of reflected energy may be received for remote objects disposed at the peak of the difference antenna pattern as compared with the arrangement in which transmitted energy is supplied to sum arm S.

Although my invention has been illustrated in connection with a type of indicator display commonly referred to as a "C" presentation, other varieties may be obviously employed. For example, a sweep generator, synchronized with pulser 16, may be incorporated in the system to supply sweep waves to deflection coils 64 and 65 of amplitudes which depend upon the elevational positions of antenna array 10. Thus, the well-known form of range-height (RH1) presentation may be produced.

While I have shown a particular embodiment of my invention, it is to be understood that changes and modifications may be made without departing from the invention in its broader aspects, and, therefore, the aim of the appended claims is to cover all such changes and modifications as fall within the true spirit and scope of my invention.

What I claim as new and desire to secure by Letters Patent of the United States is:

1. In combination, means to radiate pulses in a desired direction in space and to receive reflections of said pulse from said direction, said means including a pair of receptors having field patterns in a desired plane having a principal axis from which said reflections are received with maximum sensitivity, means to combine reflections received from directions in said pattern at one side of said axis to produce potentials in only a positive range of values and to combine reflections from directions in said pattern at the opposite side of said axis to produce potentials in only a negative range of values, an indicator, and means to control said indicator by potentials in only one of said ranges of values.

2. The combination, in a pulse echo apparatus, two means to radiate pulses in a desired direction and to receive pulses from said direction, said means having substantially coincident field patterns in space, said patterns in a desired plane having axes of maximum sensitivity, means to combine the outputs of said two means corresponding to reflections recevied from directions in said plane at one side of said axes to effect potentials in only a positive range of values and to combine the output of said two means corresponding to reflections received from directions in said plane at the opposite side of said axes to effect potentials in only a negative range of values, an indicator, and means to control said indicator by potentials in only one of said ranges.

3. In combination, a pair of wave-energy-intercepting devices disposed on opposite sides of a reference plane and having similarly oriented energy-distribution space patterns, means for combining the outputs of said devices to derive the vector sum and the vector difference thereof, a phase detector supplied with said vector sum and said vector difference to produce an output potential having a range of positive values relative to a reference potential for energy transmitted from remote points disposed in space to one side of said reference plane and having a range of negative values relative to said reference potential for energy transmitted from remote points disposed in space to the other side of said reference plane, and means for producing indications in response to output potentials within only one of said ranges of values.

4. A system for receiving wave energy radiated by remote objects comprising, an antenna system including a pair of wave-energy-intercepting antennas disposed on opposite sides of a reference plane and having similarly oriented energy-distribution space patterns, means for combining the outputs of said antennas to derive the vector sum and the vector difference thereof, a phase detector supplied with said vector sum and said vector difference to produce an output potential having a range of positive values relative to a reference potential for energy transmitted from remote objects disposed in space to one side of said reference plane and having a range of negative values relative to said reference potential for energy transmitted from remote objects disposed in space to the other side of said reference plane, and means for producing indications in response to output potentials within only one of said ranges of values.

5. An object detection system for radiating wave energy and for receiving wave energy reflected by remote objects comprising, an antenna system including a pair of wave-energy-intercepting antennas disposed on opposite sides of a reference plane and having similarly oriented energy-distribution space patterns, means for combining the outputs of said antennas to derive the vector sum and the vector difference thereof, a phase detector supplied with said vector sum and said vector difference to produce an output potential having a range of positive values relative to a reference potential for energy reflected from remote objects disposed in space to one side of said reference plane and having a range of negative values relative to said reference potential for energy reflected from remote objects disposed in space to the other side of said reference plane, and means for producing indications in response to output potentials within only one of said ranges of values.

6. A pulse-echo system comprising, an antenna system including a pair of antenna elements disposed on opposite sides of a reference plane and having similarly oriented energy-distribution space patterns, means for supplying recurrent pulses of wave energy to said elements of said antenna system for radiation into space, wave-combining means operative at least during the intervals between successive ones of said recurrent pulses of wave energy to combine the outputs of said devices resulting from the reflection of wave energy from remote objects and to derive the vector sum and the vector difference thereof, a phase detector supplied with said vector sum and said vector difference to produce an output potential having a range of positive values relative to a reference potential for energy reflected from remote objects disposed in space to one side of said reference plane and having a range of negative values relative to said reference potential for energy reflected from remote objects disposed in space to the other side of said reference plane, and means for producing indications in response to output potentials within only one of said ranges of values.

7. A pulse-echo system for operation at relatively low altitudes with respect to the earth comprising, an antenna system including a pair of antenna elements disposed on opposite sides of and in a plane transverse to a substantially horizontal reference plane and having similarly oriented energy-distribution space patterns, means for supplying recurrent pulses of wave energy to said elements of said antenna system for radiation into space, wave combining means operative at least during the intervals between successive ones of said recurrent pulses of wave energy to combine the outputs of said devices resulting from the reflection of wave energy from remote objects and to derive the vector sum and the vector difference thereof, a phase detector supplied with said vector sum and said vector difference to produce an output potential having a range of positive values relative to a reference potential for energy reflected from remote objects disposed in space above said reference plane and having a range of negative values relative to said reference potential for energy reflected from remote objects disposed in space below said reference plane, and means for producing indications in response to output potentials within the aforesaid positive range of values, to the exclusion of said negative range thereby minimizing the effects of ground returns.

8. In combination, a pair of wave-energy-intercepting devices disposed on opposite sides of a reference plane and having similarly oriented energy-distribution space patterns, control means for concurrently displacing said space patterns of said devices to scan a volume in space, means for combining the outputs of said devices to derive the vector sum and the vector difference thereof, a phase detector supplied with said vector sum and said vector difference to produce an output potential having a range of positive values relative to a reference potential for energy transmitted from remote points disposed in space to one side of said reference plane and having a range of negative values relative to said reference potential for energy transmitted from remote points disposed in space to the other side of said reference plane, a cathode ray type indicator including a viewing screen and electron beam means for projecting an electron beam toward said screen and subject to potentials of negative polarity relative to said reference potential for interrupting said electron beam, means synchronized with said control means for deflecting said electron beam in accordance with scanning of said space patterns, and means coupling said phase detector to said electron beam means for controlling the intensity of said electron beam in accordance with said output potentials to produce an indication having a disposition on said viewing screen depending upon the position of the corresponding one of said points disposed in space to said one side of said reference plane, to the exclusion of indications for points disposed in space to said other side of said reference plane.

9. A radar system comprising antenna means adapted to produce a pair of directive echo reception patterns having an equal signal axis for echoes received from a remote object, means for deriving separate signals corresponding respectively to the sum and to the difference of the echoes received by said antenna means within said patterns, means responsive to the relative values of said sum and difference signals for producing only a positive polarity signal for echoes received from directions on one side of said axis and only a negative polarity signal for echoes received from directions on the other side of said axis, and means responsive to the difference in polarity of said positive and negative polarity signals for utilizing only one of said last-named signals.

10. A monopulse radar system comprising antenna means adapted to produce a pair of directive echo reception patterns of the signal comparison type having an equal signal axis for echoes received from a remote object, means for deriving separate signals corresponding respectively to the sum and to the difference of radar echoes received by said antenna means within said pair of patterns, means responsive to the relative phases of said sum and difference signals for producing only a positive polarity signal for echoes received from directions on one side of said axis and only a negative polarity signal for echoes received from directions on the other side of said axis, a cathode ray tube indicator, said indicator comprising a cathode ray beam intensity control electrode adapted to intensify said beam in response to an applied signal, said electrode coupled to said last named producing means and adapted to respond to only one of said produced polarity signals.

11. A monopulse radar system comprising antenna means adapted to produce a pair of directive echo reception patterns of the signal comparison type having an equal signal axis for echoes received from a remote object, means for deriving separate signals corresponding respectively to the sum and to the difference of radar echoes received by said antenna means within said pair of patterns, said signals having a relative phase indicative of the direction from which the echoes are being received, means responsive to the relative phases of said sum and difference signals for producing only a positive polarity signal for echoes received from directions on one side of said axis and only a negative polarity signal for echoes received from directions on the other side of said axis, and means for displaying signal of only one polarity.

References Cited by the Examiner

UNITED STATES PATENTS

| | | | |
|---|---|---|---|
| 2,409,448 | 10/46 | Rost et al. | 343—7.4 |
| 2,456,666 | 12/48 | Agate et al. | 343—5 |
| 2,567,197 | 9/51 | Fox | 343—16 |
| 2,608,683 | 8/52 | Blewett | 343—16 |
| 2,631,279 | 3/53 | Bollinger et al. | 343—16 |

FOREIGN PATENTS 610,664  10/48  Great Britain.

CHESTER L. JUSTUS, *Primary Examiner.*

NORMAN H. EVANS, *Examiner.*

UNITED STATES PATENT OFFICE
CERTIFICATE OF CORRECTION

Patent No. 3,197,776

July 27, 1965

Oliver H. Winn

It is hereby certified that error appears in the above numbered patent requiring correction and that the said Letters Patent should read as corrected below.

Column 6, line 73, after "reflections" insert -- received --; column 7, line 9, for "recevied" read -- received --.

Signed and sealed this 15th day of March 1966.

(SEAL)
Attest:

ERNEST W. SWIDER
Attesting Officer

EDWARD J. BRENNER
Commissioner of Patents